(12) United States Patent
Stoschek et al.

(10) Patent No.: US 7,358,894 B2
(45) Date of Patent: Apr. 15, 2008

(54) KEY FOR A VEHICLE

(75) Inventors: Arne Stoschek, Palo Alto, CA (US); Rizwan Ahmed, Stanford, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 184 days.

(21) Appl. No.: 11/120,787

(22) Filed: May 3, 2005

(65) Prior Publication Data
US 2005/0248484 A1    Nov. 10, 2005

Related U.S. Application Data

(60) Provisional application No. 60/567,852, filed on May 4, 2004.

(51) Int. Cl.
*G01S 1/00* (2006.01)
*G01S 3/02* (2006.01)

(52) U.S. Cl. .......................... 342/357.09; 342/357.07; 342/457

(58) Field of Classification Search ........... 342/357.01, 342/357.06, 357.07, 357.09, 357.13, 457; 701/213, 215
See application file for complete search history.

(56) References Cited

U.S. PATENT DOCUMENTS

| | | | | |
|---|---|---|---|---|
| 5,025,261 | A |  6/1991 | Ohta et al. ................. | 342/357 |
| 6,025,774 | A |  2/2000 | Forbes ........................ | 340/426 |
| 6,058,338 | A |  5/2000 | Agashe et al. ................ | 701/13 |
| 6,081,229 | A |  6/2000 | Soliman et al. ......... | 342/357.05 |
| 7,010,403 | B2 * | 3/2006 | Adachi et al. ............... | 701/50 |
| 2001/0009406 | A1 * | 7/2001 | Mise et al. ............ | 342/357.09 |
| 2001/0016792 | A1 * | 8/2001 | Matsuo ........................ | 701/35 |
| 2002/0164998 | A1 | 11/2002 | Younis ....................... | 455/456 |
| 2003/0151501 | A1 | 8/2003 | Teckchandani et al. | 340/426.19 |
| 2003/0151507 | A1 | 8/2003 | Andre et al. ............ | 340/539.13 |

FOREIGN PATENT DOCUMENTS

| | | |
|---|---|---|
| DE | 69021900 | 1/1990 |
| DE | 29624363 | 11/1996 |
| DE | 19826904 | 6/1998 |
| DE | 19906529 | 2/1999 |
| DE | 10046571 | 9/2000 |
| DE | 10112994 | 3/2001 |
| DE | 19938951 | 3/2001 |
| DE | 10111552 | 9/2002 |
| DE | 10112994 | 11/2002 |
| DE | 20309282 | 1/2003 |

(Continued)

*Primary Examiner*—Dao Phan
(74) *Attorney, Agent, or Firm*—Baker Botts L.L.P.

(57) ABSTRACT

A vehicle comprises a base station for wireless transmission of locating support information to support locating, supported on a locating satellite, as well as a key for the vehicle, in which the key includes a locating module to determine the position of the key as a function of a signal of at least one locating satellite and locating support information sent from the vehicle. A locating system and a method for determination of the position of a mobile device separable from the vehicle, comprise that the locating system includes a base station arranged in the vehicle for wireless transmission of locating support information and a locating module arranged in the mobile device to determine the position of the mobile device as a function of a signal of at least one locating satellite and the locating support information. The mobile device, for example, can be a key for a vehicle.

14 Claims, 4 Drawing Sheets

FOREIGN PATENT DOCUMENTS

| | | |
|---|---|---|
| DE | 10331112 | 8/2004 |
| EP | 0780273 | 12/1995 |
| EP | 1234735 | 8/2002 |
| EP | 1420379 | 5/2004 |
| JP | 11229680 | 8/1999 |
| JP | 2000145223 | 5/2000 |

* cited by examiner

US 7,358,894 B2

KEY FOR A VEHICLE

PRIORITY

This application claims priority to and is converted from U.S. Provisional Application 60/567,852 filed May 4, 2004.

TECHNICAL FIELD OF THE INVENTION

The present invention concerns a key for a vehicle, a vehicle, as well as a locating system or method for determining the position of the key or mobile device.

DESCRIPTION OF THE RELATED ART

A device to find a vehicle, with a key to close or open the vehicle, a GPS receiver to determine the actual location of the vehicle being found at a selectable time and to determine the instantaneous position of the user, a memory to enter the determined location of the vehicle being found, a first antenna allocated to the GPS receiver, a device to calculate the direction and/or distance of the user to the actual location of the vehicle being found entered in the memory, and with a device to output the calculated direction and/or distance is known from DE 199 38 951 A1.

A mobile transponder for vehicles with an optical display for the location of the vehicle with reference to the transponder is known from DE 101 11 552 A1 and DE 101 12 994 A1, in which the mobile transponder includes a GPS receiver and determines the position, in which the transponder is located, and in which the transponder compares its own position with the position of the vehicle, and derives from comparison of the two values direction information and displays the direction in which the vehicle is situated relative to the position of the transponder.

Keys with an allocated GPS receiver appropriate for vehicles are also known from JP2000145223A and JP11229680A.

The task of the invention is to improve locating by means of a key or mobile device.

SUMMARY OF THE INVENTION

The aforementioned task is solved by a vehicle with a base station, especially an A-GPS base station, for wireless transmission of location support information to support satellite supported locating.

In one embodiment of the invention, the locating support information includes information for time synchronization with at least one of said satellites, especially a current time information in a time system of at least one of said satellites.

In another embodiment of the invention, the locating support information also includes a travel time of a signal emitted by the base station to receipt of the signal by a mobile device spatially separated from the base station, especially a key allocated to the vehicle.

The aforementioned task is also solved by a key for a vehicle, in which the key includes a locating module to determine the position of the key as a function of a signal of at least one locating satellite (but especially, as an alternative, the signals of fewer than four locating satellites) and locating support information that can be sent from the vehicle.

In one embodiment of the invention, the locating support information includes information for time synchronization with at least one locating satellite, especially a current time information in a time system of at least one locating satellite.

In another embodiment of the invention, the locating support information also includes a travel time of a signal transmitted between the signal and the key.

The aforementioned task is also solved by a locating system to determine the position of a mobile device separable from a vehicle, especially a key assigned to the vehicle, in which the locating system comprises a base station arranged in the vehicle for wireless transmission of a locating support information and a locating module arranged in the mobile device for determination of the position of the mobile device as a function of a signal of at least one locating satellite (but especially, as an alternative, the signals of fewer than four locating satellites) and the locating support information.

In one embodiment of the invention, the locating support information includes information for time synchronization with the at least one locating satellite, especially current time information in a time system of at least one locating satellite.

In another embodiment of the invention, the locating support information also includes a travel time of a signal transmitted between the vehicle and the key.

In another embodiment of the invention, the base station is an A-GPS base station.

The aforementioned task is also solved by a method for determining the position of a key of a vehicle, in which a locating support information transmitted from the vehicle is received to support locating on at least one locating satellite, in which a satellite signal of the at least one locating satellite is received, and in which the position of the key is determined as a function of the satellite signal (but especially, as an alternative, the signals of fewer than four locating satellites) and a locating support information.

A current time or current point of time according to the invention can be essentially current time or an essentially current point of time in the narrow sense. A current time or current point of time according to the invention, however, can also be a time lying in the past or a point of time lying in the past, supplemented by age information of this time or point in time.

The vehicle according to the invention is especially a land vehicle, usable individually in traffic. Vehicles according to the invention are not particularly restricted to land vehicles with internal combustion engines.

Further advantages and details are apparent from the following description of practical examples.

DETAILED DESCRIPTION OF THE PREFERRED EMBODIMENTS

Figure 1:
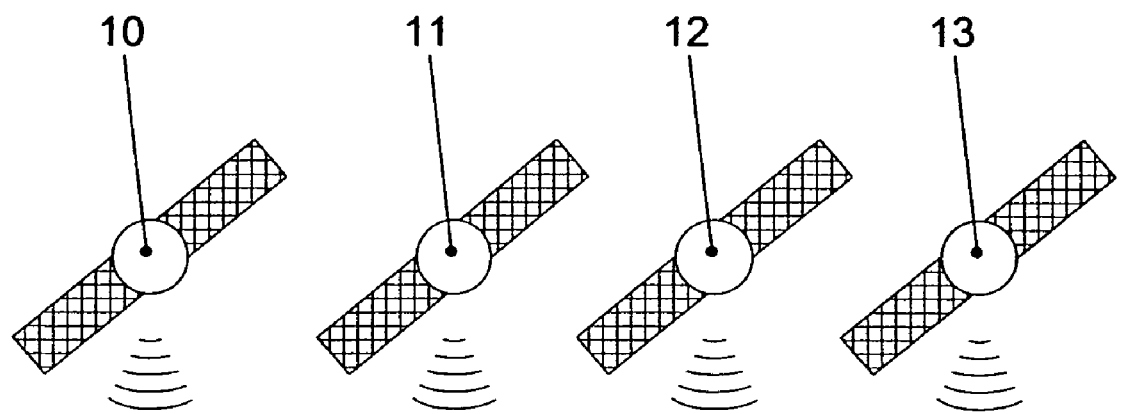
FIG. 1 shows a practical example of a locating system to determine the position of a key for a vehicle.
Figure 1:
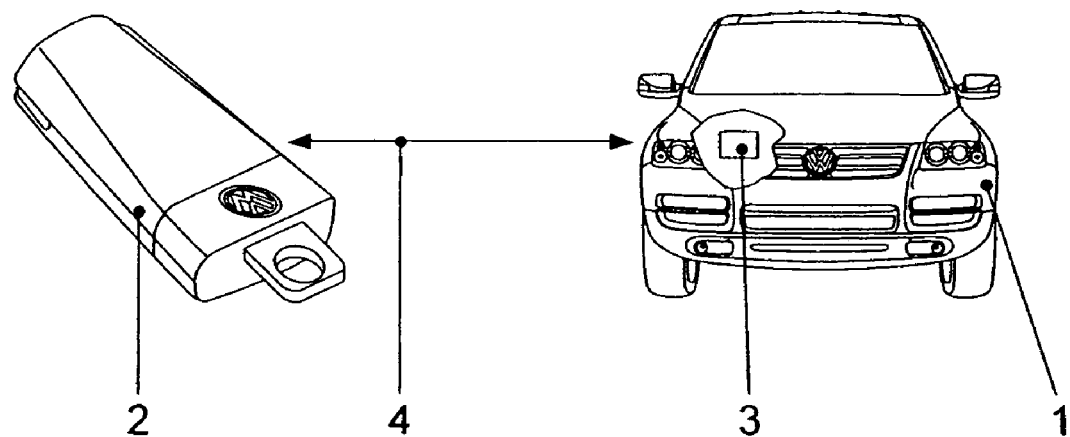

FIG. 1 shows vehicle 1 and a key 2 for contactless opening and/or closing of vehicle 1. Key 2 includes a locating module 20, explained with reference to FIG. 2, to determine the position of key 2 as a function of signals from GPS locating satellites 10, 11, 12, 13. In this case, it is usually necessary to receive the signals from at least four GPS locating satellites 10, 11, 12, 13. The locating module 20 of key 2 and vehicle 1, however, are configured, so that it is only necessary that only the signals of three or fewer GPS locating satellites 10, 11, 12 are received by means of key 2. For this purpose, the vehicle 1 has an A-GPS base station 3. Details concerning such A-GPS base station 3 can be deduced, for example, from WO 02/089507 A1 (incorporated by reference), U.S. Pat. No. 6,058,338 (incorporated by reference) and especially U.S. Pat. No. 6,081,229 (incorporated by reference).

Locating support information can be transmitted to key 2 from base station 3 via a wireless communications connection 4. The locating support information can include, for example, as disclosed in WO 02/089507A1, azimuth with a satellite, Doppler frequencies, etc. The locating support information, for example, can also, additionally or as an alternative, include correction quantities, as disclosed, in particular, in U.S. Pat. No. 6,058,338, column 5, line 8 to column 6, line 30, and permit particularly precise locating of key 2. However, it is especially prescribed that the locating support information includes, in addition or as an alternative, information for time synchronization with the GPS locating satellites 10, 11, 12, especially a current time information in a time system of the GPS locating satellites 10, 11, 12, and/or a travel time of a signal transmitted between the A-GPS base station 3 and a key 2.

Details concerning such information can be deduced from U.S. Pat. No. 6,081,229.

The key 2 and the base station 3 are a practical example of a locating system according to the claims.

Figure 2:
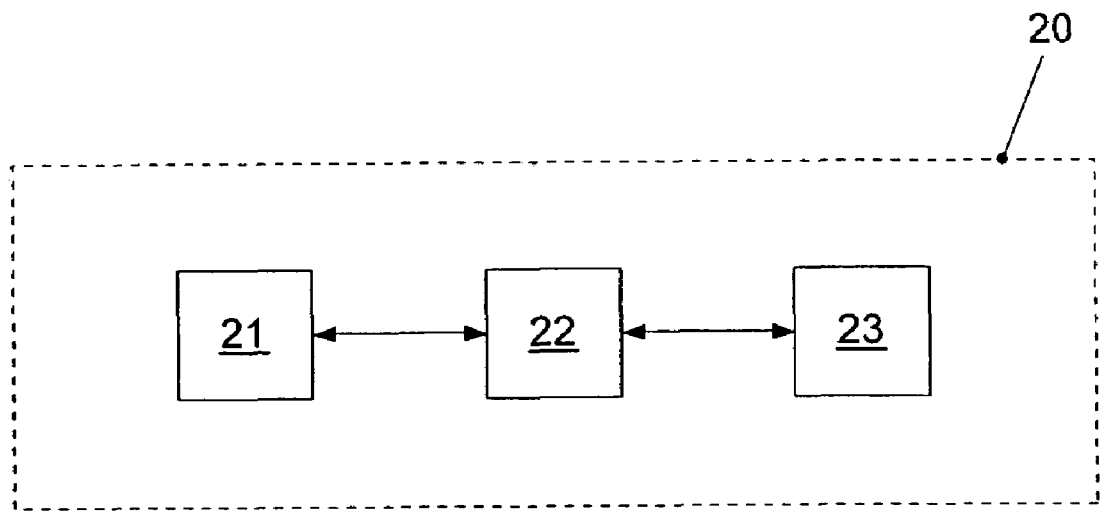
FIG. 2 shows a practical example of a locating module for a key for a vehicle.

FIG. 2 shows the locating module 20, which is implemented with the function of contactless opening and/or closing of vehicle 1 in key 2. The locating module 20 includes a communications module 21 to receive signals sent by GPS locating satellites 10, 11, 12, 13, to receive information sent from the A-GPS base station 3, and to transmit information to the A-GPS base station 3. The locating module 20 includes a man-machine interface 23 and a locating core 22, in which the algorithms for determining the position of key 2 are implemented as a function of a signal with at least one GPS locating satellite and locating support information sent by a base station 3.

Figure 3:
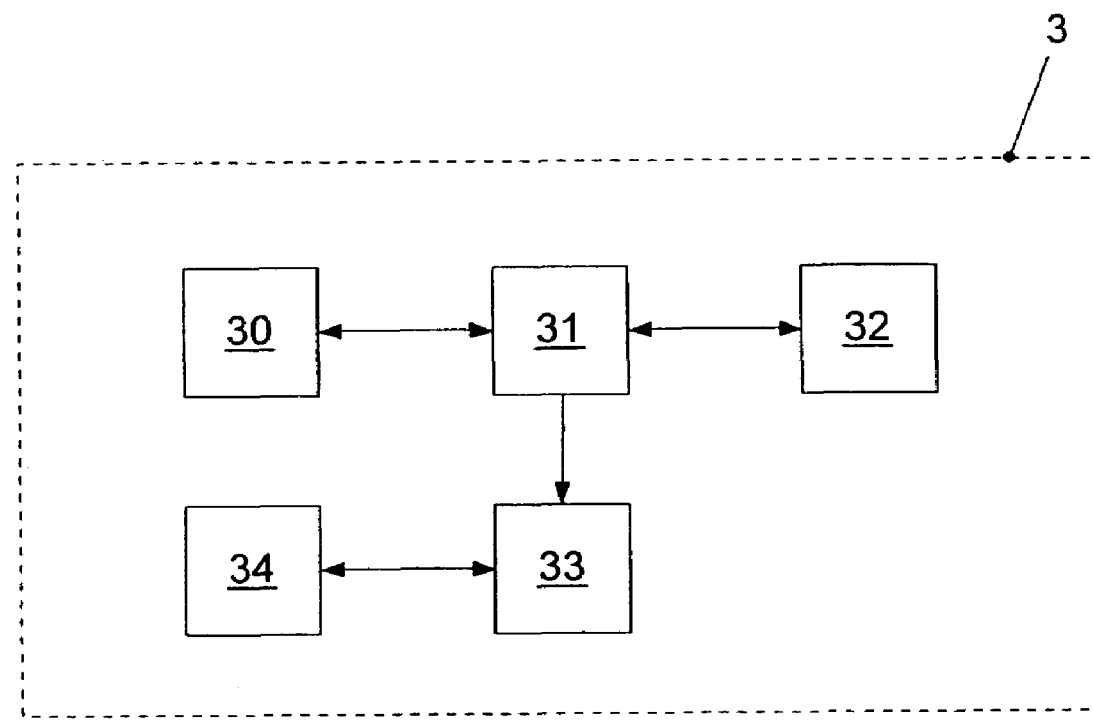
FIG. 3 shows a practical example of a base station.

FIG. 3 shows a practical example to configure the A-GPS base station 3. The A-GPS base station 3 includes a GPS receiver 30, an essentially ordinary locating system 31 and a man-machine interface 32 to operate locating system 31. The GPS receiver 30, the locating system 31, the man-machine interface 32 can be a component of an essentially ordinary navigation system. The A-GPS base station 3 also includes a locating support module 33 to generate and/or manage locating support information, as well as a communications module 32 for communication via communications connection 4. Naturally, functions or elements of the GPS receiver 30 and communications module 34 can also be combined. In an embodiment shown as an example, a current time information in a time system of the GPS locating satellites 10, 11, 12 is transmitted from the locating system 31 to the locating supporting module 33. Naturally, azimuths of satellites, Doppler frequencies, etc. and correction quantities, as disclosed in U.S. Pat. No. 6,058,338, especially column 5, line 8 to column 6, line 30, can also be transmitted. If the vehicle 1 in its (parked) position cannot receive signals from the GPS locating satellites or only signals from an insufficient number of GPS locating satellites, it sends locating support information stored in an almanac. However, this only occurs when receiving of signals from a sufficient number of GPS locating satellites goes back no longer than 10 days.

Figure 4:
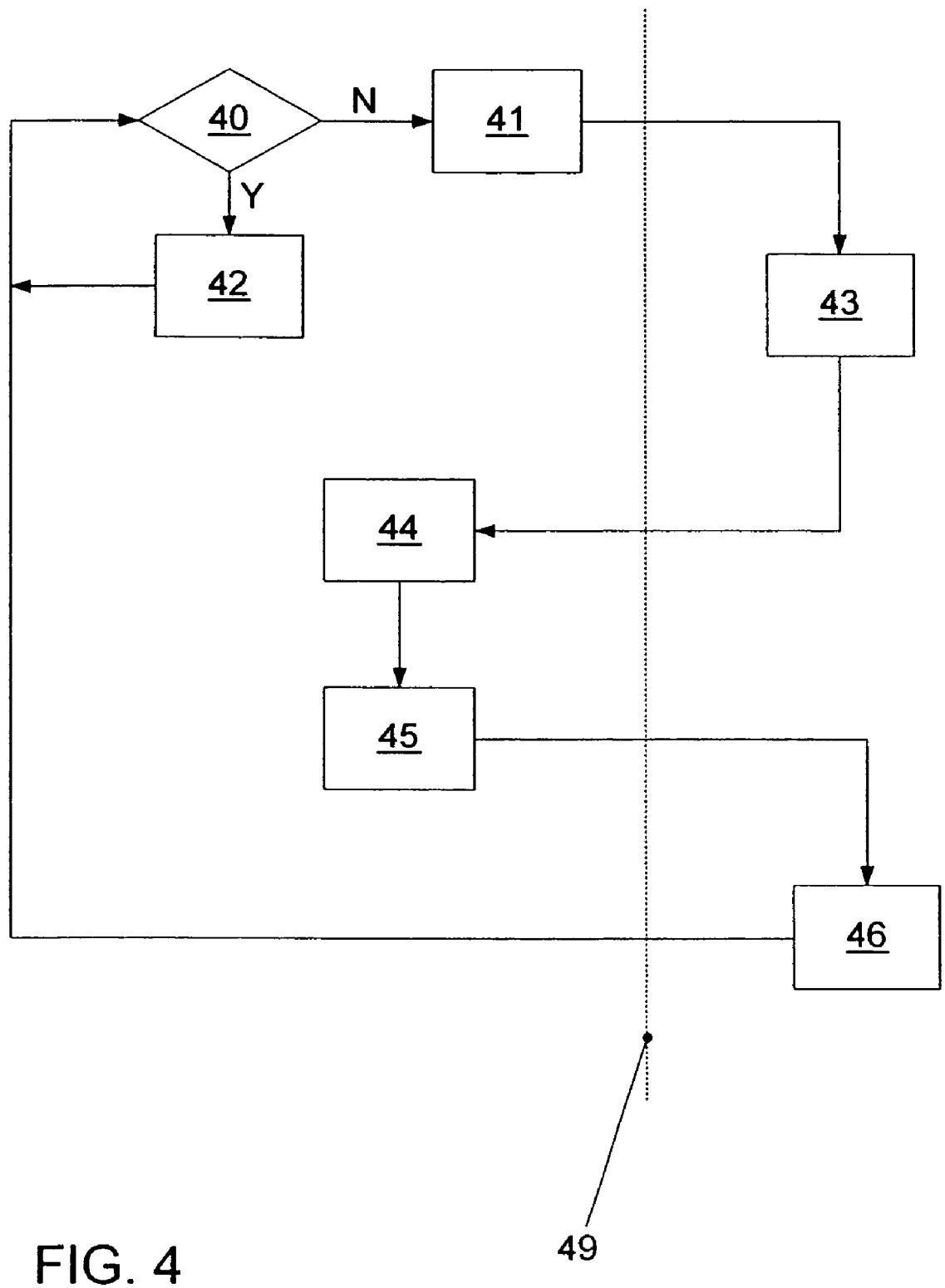
FIG. 4 shows a practical example of a method for determining the position of a key for a vehicle.

A practical example for possible cooperation of key 2 and A-GPS base station 3 and vehicle 1 is shown in the procedure depicted in FIG. 4, in which process steps allocated to the key 2 are arranged to the left of a dotted line, designated with reference number 49, and the process steps allocated to A-GPS base station 3 or vehicle 1 are arranged to the right of the dotted line, designated with reference number 49.

The process begins with a query 40, as to whether the signals from at least four GPS locating satellites 10, 11, 12, 13 are received by key 2. If the signals from at least four GPS locating satellites 10, 11, 12, 13 are received by key 2, query 40 is followed by a step 40, in which the position of the key 2 is calculated based on the signals of at least four GPS locating satellites 10, 11, 12, 13 in known fashion. Step 42 is followed again by query 40. If the signals from fewer than 4 GPS locating satellites 10, 11, 12, 13 are received by key 2, query 40 is followed by a step 41, in which locating support information is requested from the base station 3 or vehicle 1. Step 41 is followed by a step 43, in which the travel time of a signal transmitted between the A-GPS base station 3 and key 2, for example, according to the method disclosed in the sources cited U.S. Pat. No. 6,081,229, or it is determined in U.S. Pat. No. 6,081,229. The travel time is transmitted, together with a current time information, in a time system of GPS locating satellites 10, 11, 12 to key 2.

Step 43 is followed by a step 44, in which the position of key 2 is determined as a function of the signals of three GPS locating satellites 10, 11, 12, the current time information in the time system of the GPS locating satellites 10, 11, 12 and the travel time of a signal transmitted between the A-GPS base station 3 and the key 2. Details concerning such position determination can be deduced, for example, from U.S. Pat. No. 6,081,229. In addition, programs for implementation of A-GPS can be obtained from QUALCOMM, 5775 Morehouse Drive, San Diego, Calif. 92121, USA.

Step 44 is followed by a step 45, in which the A-GPS base station 3 is confirmed receipt of the locating support information, i.e., the travel time and current time information in the time system of the GPS locating satellites 10, 11, 12. Step 45 is again followed by a step 46, in which the A-GPS base station 3 terminates locating support. Query 40 follows.

It can also be prescribed that the A-GPS base station 3 transmits the position of vehicle 1 to key 2. In this case, the position of key 2 can be determined as a function of the signals of two GPS locating satellites 10, 11, the current time information in the time system of the GPS locating satellites 10, 11, the travel time of a signal transmitted between the A-GPS base station 3 and key 2 and the position of vehicle 1, if the transmission between A-GPS base station 3 and key 2 occurs via an insufficiently reflected signal. Details concerning such position determination can be gathered, for example, from U.S. Pat. No. 6,081,229.

Figure 5:
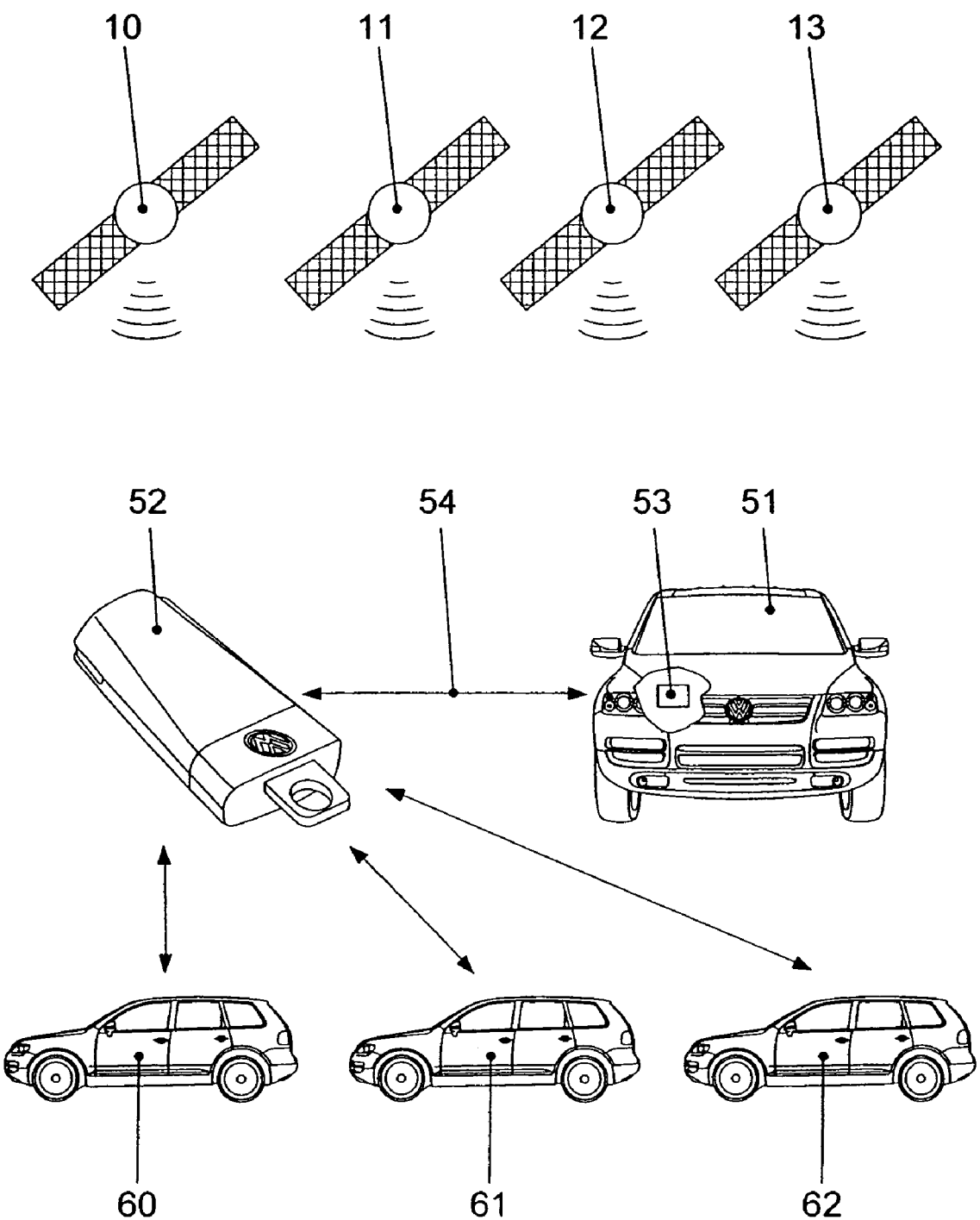
FIG. 5 shows another practical example of a locating system to determine the position of a key for a vehicle.

FIG. 5 shows vehicle 51 and a key 52 for contactless opening and/or closing of vehicle 51. Vehicle 51 has an A-GPS base station 53 that can be configured equivalent or essentially equivalent to the A-GPS base station 3. It can be prescribed that the A-GPS base station 53 can also be set up for other keys, so that the A-GPS base station 53 can also provide locating support information for other keys, especially keys of vehicles of the Volkswagen series.

It is prescribed in the present practical example that the key 52 is assigned to vehicle 51, i.e., that vehicle 51 can be opened and/or closed by means of key 52. In addition, the key 52 can obtain locating support information from vehicle 51 via a communications connection, designated with reference number 54, in the manner described with reference to FIG. 1, FIG. 2, FIG. 3 and FIG. 4. In addition, the key 52 can obtain locating support information from additional vehicles, designated with reference numbers 60, 61, 62. In this manner, the position of the key 52 can also be determined when it can only receive the signal of a GPS locating satellite 10 in the manner described in U.S. Pat. No. 6,081, 229.

The aforementioned position determination can be combined with the method disclosed in DE 101 11 552 A1 and DE 101 12 994 A1 to find a vehicle.

What is claimed is:

1. A key for a vehicle comprising:
    a locating module to determine the position of the key as a function of a signal of at least one locating satellite and locating support information that is sent from the vehicle, wherein the locating support information comprises the travel time of a signal transmitted between the key and the vehicle.

2. The key according to claim 1, the locating support information comprising:
    information for time synchronization with the at least one locating satellite.

3. The key according to claim 1, the locating support information comprising:
    a current time information in the time system of at least one locating satellite.

4. A locating system to determine the position of a mobile device separable from a vehicle, the locating system comprising:
    a base station arranged in the vehicle for wireless transmission of locating support information; and
    a locating module arranged in the mobile device to determine the position of the mobile device as a function of a signal of at least one locating satellite and the locating support information, wherein the locating support information comprises the travel time of a signal transmitted between the base station and the mobile device.

5. The locating system according to claim 4, in which the mobile device is a key assigned to the vehicle.

6. The locating system according to claim 4, the locating support information comprising:
    information for time synchronization with the at least one locating satellite.

7. The locating system according to claim 4, the locating support information comprising:
    current time information in a time system of the at least one locating satellite.

8. The locating system according to claim 4, in which the base station is an A-GPS base station.

9. A method for determination of the position of the key of a vehicle, the method comprising the steps of:
    receiving in the key locating support information comprising the travel time of a signal transmitted between the key and the vehicle sent by the vehicle to support locating, supported on at least one locating satellite;
    receiving in the key a satellite signal of at least one locating satellite; and
    determining in the key of the position of the key as a function of the satellite signal and the locating support information.

10. The method according to claim 9, wherein the locating support information comprises information for time synchronization with the at least one locating satellite.

11. The method according to claim 9, wherein the locating support information comprises current time information in a time system of the at least one locating satellite.

12. A key for a vehicle having a locating module comprising
    a communication module for directly receiving of a signal of at least one locating satellite and for directly receiving of locating support information sent from the vehicle wherein the locating support information comprises information for time synchronization with the at least one locating satellite, and
    a device for calculating the geographical position of the key from the signals received by the communication module.

13. The key according to claim 12, the locating support information comprising:
    a current time information in the time system of at least one locating satellite.

14. The key according to claim 12, the locating support information comprising:
    the travel time of a signal transmitted between the key and the vehicle.

* * * * *